(12) United States Patent  (10) Patent No.: US 9,207,615 B2
Devlieghere et al.  (45) Date of Patent: Dec. 8, 2015

(54) DIGITAL PRINTING METHOD AND SYSTEM WITH LEFT/RIGHT CORRECTION

(71) Applicant: Xeikon IP BV, Eede (NL)

(72) Inventors: Jurgen Norbert Bart Devlieghere, Borgerhout (BE); Marc Lodewijk Cornelia Goetschalckx, Lint (BE); Romain Jan Victor Paul van der Gucht, Lint (BE)

(73) Assignee: Xeikon IP B.V., Eede (NL)

( * ) Notice: Subject to any disclaimer, the term of this patent is extended or adjusted under 35 U.S.C. 154(b) by 0 days.

(21) Appl. No.: 14/525,756

(22) Filed: Oct. 28, 2014

(65) Prior Publication Data

US 2015/0139673 A1   May 21, 2015

(30) Foreign Application Priority Data

Nov. 15, 2013 (NL) ...................................... 2011808

(51) Int. Cl.
 *G03G 15/00* (2006.01)
(52) U.S. Cl.
 CPC .......... *G03G 15/556* (2013.01); *G03G 15/5058* (2013.01)

(58) Field of Classification Search
 CPC ......................... G03G 15/5033; G03G 15/556
 USPC ....................................................... 399/49, 72
 See application file for complete search history.

(56) References Cited

U.S. PATENT DOCUMENTS

| 5,404,202 | A | 4/1995 | Abramsohn |
| 5,579,092 | A | 11/1996 | Isobe et al. |
| 7,021,738 | B2 * | 4/2006 | Juan et al. ........................ 347/19 |
| 2004/0227966 | A1 | 11/2004 | Lee |
| 2009/0296122 | A1 | 12/2009 | Broddin et al. |
| 2011/0164293 | A1 | 7/2011 | Eom |

* cited by examiner

*Primary Examiner* — Hoang Ngo
(74) *Attorney, Agent, or Firm* — The Webb Law Firm

(57) ABSTRACT

Digital printing method for printing an image, using a printing system capable of printing a plurality of density levels, including: printing at least one left control strip in a left zone of a print medium and at least one right control strip in a right zone of said print medium, said left control strip including at least one left patch and said right control strip including at least one right patch, wherein settings are used which are intended for printing the same color and/or density level for a left patch of said at least one left patch and for a corresponding right patch of said at least one right patch; measuring a density level and/or color of at least said printed left patch and right patch; adjusting said printing system based on a difference between the measured density levels and/or colors of said left patch and said right patch in order to perform a left-right correction in said image to be printed; and printing the image using said adjusted printing system.

20 Claims, 6 Drawing Sheets

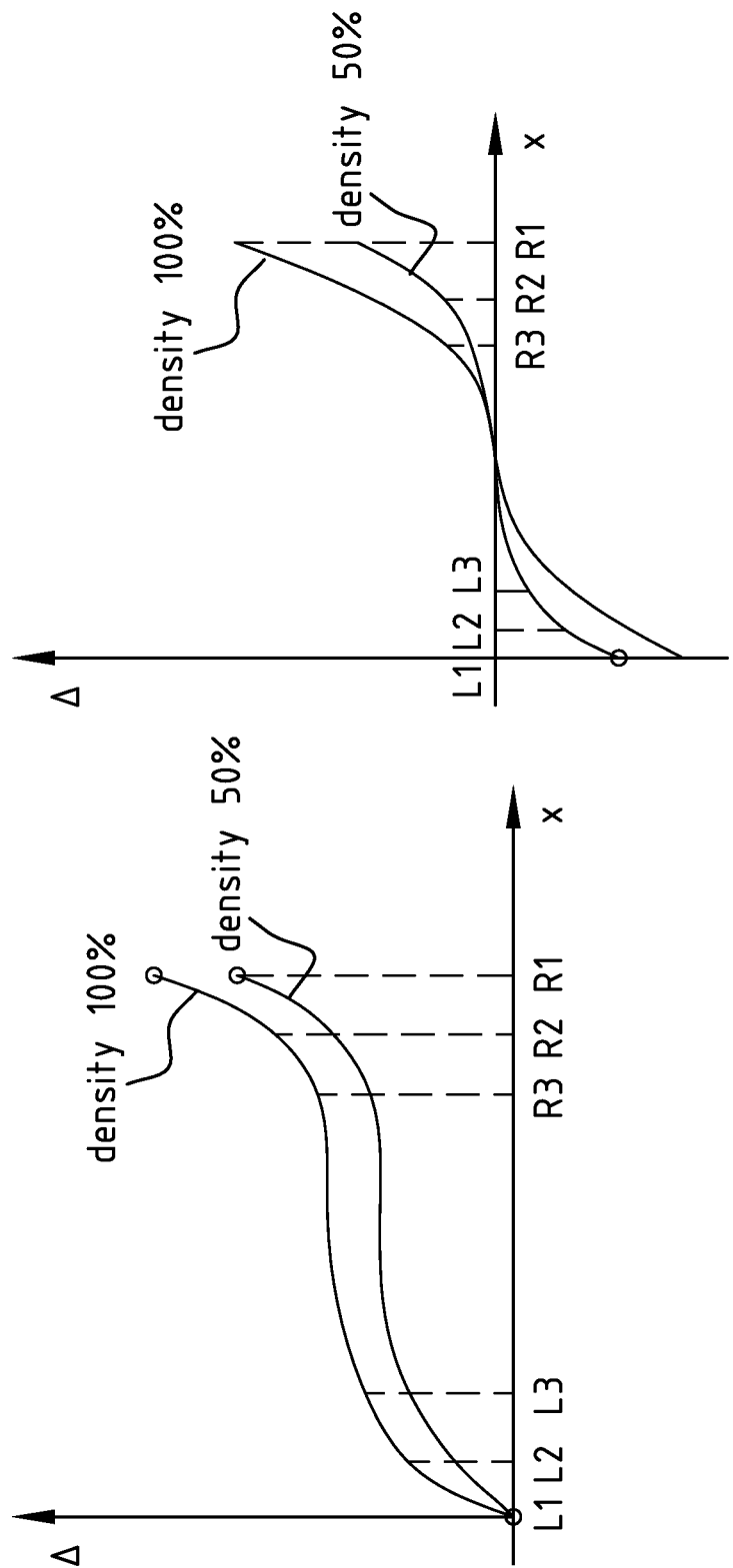

DIGITAL PRINTING METHOD AND SYSTEM WITH LEFT/RIGHT CORRECTION

CROSS-REFERENCE TO RELATED APPLICATION

This application claims priority to Netherlands Patent Application No. 2011808 filed Nov. 15, 2013, the disclosure of which is hereby disclosed in its entirety by reference.

BACKGROUND OF THE INVENTION

1. Field of the Invention

The present invention relates to a digital printing method and system and to a computer program product.

2. Description of Related Art

In prior art digital printing systems, in particular in electrophotographic printing systems using dry or liquid toner, often the same color is not printed exactly the same in a right and a left zone of a print medium. In liquid toner systems this may be due to pressure differences between a left and a right area of the rollers. Also, in dry toner systems often the alignment is not perfect, and taking into account the typical very small focus depth, left/right differences may be present. Usually such small color differences are not a problem since the eye does not see those left and right zones next to each other. However for certain applications, such as printing of wall paper, when the same color needs to be printed in a left and right zone of the print medium, it is desirable to avoid non-uniformities in the left and right zone.

An object of embodiments of the invention is to provide an improved digital printing system and method capable of dealing with left/right differences.

SUMMARY OF THE INVENTION

According to a first aspect of the invention, there is provided a digital printing method for printing an image, using a printing system capable of printing a plurality of density levels. The method comprises:

printing at least one left control strip in a left zone of a print medium and at least one right control strip in a right zone of said print medium, said left control strip comprising at least one left patch and said right control strip comprising at least one right patch, wherein settings are used which are intended for producing the same color and/or density level for a left patch and for a corresponding right patch;

measuring a density level and/or color of at least said left patch and said right patch;

adjusting said printing system based on a difference between the measured density levels and/or colors of said left patch and said right patch in order to perform a left-right correction in the image to be printed;

printing the image using said adjusted printing system.

Embodiments of the invention are based inter alia on the inventive insight that non-uniformities in color and/or density vary gradually from left to right and can be compensated by measuring differences between a left and right control strip. Using those differences the settings of the image processing means and/or of the printing means are adjusted in order reduce or eliminate the left/right differences in color and/or density.

When the printing system uses settings intended for producing the same color and/or density for a left patch and a right patch, in an ideal printing system the left and right patch are printed in the same color with the same density. However, due to e.g. alignment problems, left/right differences may exist. By adjusting the image processing means and/or the printing means (e.g. a print head) in function of the measured differences, i.e. by making the image processing means send adjusted print data to the printing means and/or by adjusting the settings of the actual printing means, the left/right differences may be reduced or eliminated.

In a preferred embodiment the left control strip comprises a plurality of left patches, and the right control strip comprises a corresponding plurality right patches. In that case the printing system uses preferably different intended colors and/or density levels for the plurality of left patches and the same different intended colors and/or density levels for the plurality of right patches. The measuring comprises measuring each left and corresponding right patch, and the adjusting is based on a plurality of differences between each left and corresponding right patch.

Preferably the at least one left and right control strip are printed together with a first image during a first print job, and the adjusting is performed after or during the printing of the first image, and before printing a second image during a second later print job. After having adjusted the printing system, the second image is printed using the adjusted printing system. In other words, during of after the printing of a first image, the printing system is prepared for printing the second image. In that way the printing system may be continuously readjusted ensuring a continuous correction of left/right non-uniformities. It is noted that the adjusting of the printing means, i.e. of the printing head of the print system cannot be done during the printing of the first image. However the image processing means may be adjusted as soon as the print data of the first image is sent to the printing means. In other words, if the image processing means are adjusted, then this may be done during the printing of the first image.

In such an embodiment it may be advantageous to determine at least one color, typically a mixed color based on or used in the second image to be printed, said color being typically a combination of two or more of the basic print colors, typically cyan, black, magenta, yellow. The determined at least one color will typically comprise the main colors used in the second image. This determined color may then be used for setting the color of the left and right patch. There could be provided e.g. a left and a right control strip each containing a plurality of patches in different mixed colors, wherein the same intended color is used for each left and corresponding right patch.

In a possible embodiment the at least one left and right control strip each comprises a control strip comprising a plurality of cyan patches having different density levels, a control strip comprising a plurality of black patches having different density levels, a control strip comprising a plurality of magenta patches having different density levels, and a control strip comprising a plurality of yellow patches having different density levels.

Preferably, the at least one left and right control strip are printed at least in a left and right margin of the print medium. More preferably, the left and right control strips are printed at the top and/or at the bottom of the print medium, outside a normal printing area for printing an image. In that way an edge of the print medium containing the at least one left and right control strips can be easily cut.

In a preferred embodiment the print area is divided in a plurality of adjacent columns extending in a printing direction, and the measured density levels are used to determine for each column of said plurality of adjacent columns at least one correction value; and the adjusting is based on said at least one correction value for each column. In a further developed embodiment the columns are one pixel wide. In such an embodiment a pixel-wise left/right correction may be performed.

Measuring the density and/or color of the control strips may be performed using any suitable measurement device, e.g. a densitometer, a spectrophotometer, a calorimeter, and/or a camera. There may be provided at least one left and right measurement device, but there may also be provided a moveably measurement device, moving from left to right and back, in order to measure the at least one left and right control strip. In the latter case, it is advantageous to print the left and right control strip in different rows, seen in a print direction of the printing means, so that the printing does not need to be interrupted for measuring the control strips.

Preferably the adjusting comprises adjusting printing means of the printing system and/or adjusting image processing means of the printing system.

In a possible embodiment the printing means comprises a LED array, and the adjusting comprises, for a group of a plurality of LED groups of the LED array, each group comprising at least one adjacent LED, adjusting an amount of light emitted by said group. In other words, if for a particular group the density is higher or lower than a reference density, the light emitted for that group may be decreased or increased, respectively. The skilled person understands that the reference density may be the value measured e.g. in the utmost left pixel. It is possible to take any pixel as a reference pixel, or to use an average density value computed as an average of a number of measured densities of a number of pixels.

Embodiments of the invention are also applicable with inkjet heads and more generally, with any printing means. In an ink jet printer typically a number of inkjet heads are arranged adjacent each other. Due to the flow of ink within an inkjet head, an inkjet head also suffers from left/right differences. Using a left and right patch for each inkjet head such differences may be compensated. In other words, for a plurality of adjacent inkjet heads, it will be preferred to use a plurality of adjacent left/right patch pairs.

In another possible embodiment the image processing means comprises screening means, and the adjusting comprises adjusting said screening means in addition to or instead of the adjusting of the printing means. Screening is a reprographic image processing technique that simulates continuous tone imagery through the use of dot clusters, varying either in size, in shape or in spacing. An example of a suitable screening technique is disclosed in US2009/0296122 in the name of the Applicant. Adjusting the screening means may comprise adjusting the color compositions of a color to be printed. E.g. if a certain color is normally printed with x % of magenta, and y % of yellow, the screening means may be adjusted so that the utmost left pixel is printed with x % of magenta, and y % of yellow, while a right pixel it is printed with x' % of magenta, and y' % of yellow.

According to a second aspect of the invention, there is provided a digital printing system capable of printing a plurality of density levels. The system comprises an image processing means; a printing means; a control strip controller, at least one measuring device, and a left/right controller. The control strip controller (which may be included in the image processing means) is configured for controlling the printing means to print at least one left control strip in a left zone of a print medium and at least one right control strip in a right zone of the print medium, said left control strip comprising at least one left patch and said right control strip comprising at least one right patch. The control strip controller is configured for controlling the printing means using settings which are intended for producing the same color and/or density level for a left patch and for a corresponding right patch. The at least one measuring device is configured for measuring a density level and/or color of said left and right patch. The left/right controller is configured for adjusting said printing means and/or said image processing means based on a difference between the measured density levels and/or colors of said left and right patch in order to perform a left-right correction in the image to be printed.

In a preferred embodiment the left control strip comprises a plurality of left patches and the right control strip comprises a corresponding plurality right patches, wherein the control strip controller is configured for using different intended colors and/or density levels for said plurality of left patches and the same different intended colors and/or density levels for said plurality of right patches. The at least one measuring device is configured for measuring each left and corresponding right patch, and the left/right controller is configured for adjusting the printing means and/or the image processing means based a plurality of differences between each left and corresponding right patch.

Preferably the control strip controller is configured for controlling the printing means to print the at least one left and right control strip together with a first image during a first print job, and the left/right controller is configured for performing the adjusting after or during the printing of the first image, such that a second image is printable using the adjusted print means and/or image processing system during a later print job.

In a further developed embodiment, the control strip controller is configured to determine at least one color, based on or used in the second image to be printed, said color being typically a combination of two or more basic colors; and to include said at least one color in the at least one left and right control strip.

In a preferred embodiment the control strip controller is configured for controlling said printing means to print a left and right control strip comprising a plurality of cyan patches having different density levels, a left and right control strip comprising a plurality of black patches having different density levels, a left and right control strip comprising a plurality of magenta patches having different density levels, and a left and right control strip comprising a plurality of yellow patches having different density levels.

In a preferred embodiment the control strip controller is configured for controlling the printing means to print the at least one left and right control strip at least in a left and right margin of the print medium, preferably at the top and/or at the bottom of the print medium, outside a normal printing area for printing an image.

In a further developed embodiment the left/right controller is configured for using the measured density levels or colors to determine for each column of a plurality of adjacent columns of the print area (a column extending in the printing direction), at least one correction value, and is configured for adjusting the printing means and/or the image processing means based on the at least one correction value for each column.

Preferably the left/right controller is configured for adjusting the printing means, and in particular a LED array, based on a difference between the measured density levels and/or colors of said at least one left control strip and said at least one right control strip, wherein the adjusting comprises adjusting an amount of light emitted by each LED group of a plurality of LED groups of the LED array, each LED group comprising at least one adjacent LED. Alternatively or in addition the left/right controller may be configured for adjusting the image processing means, and in particular the screening means thereof.

The advantages and features discussed above in connection with the method also apply for the corresponding features of the system, and the skilled person understands that any features disclosed for embodiments of the method may also be applied in the system.

According to another aspect there is provided a digital data storage medium encoding a machine-executable program of instructions to perform any one of the steps of embodiments of the method disclosed above.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIGS. 5B and 5C are graphs plotting the difference between the measured density level and a reference density level in function of the position (going from utmost left to utmost right), for a set density level of 50% and of 100%;

DESCRIPTION OF THE INVENTION

Figure 1:
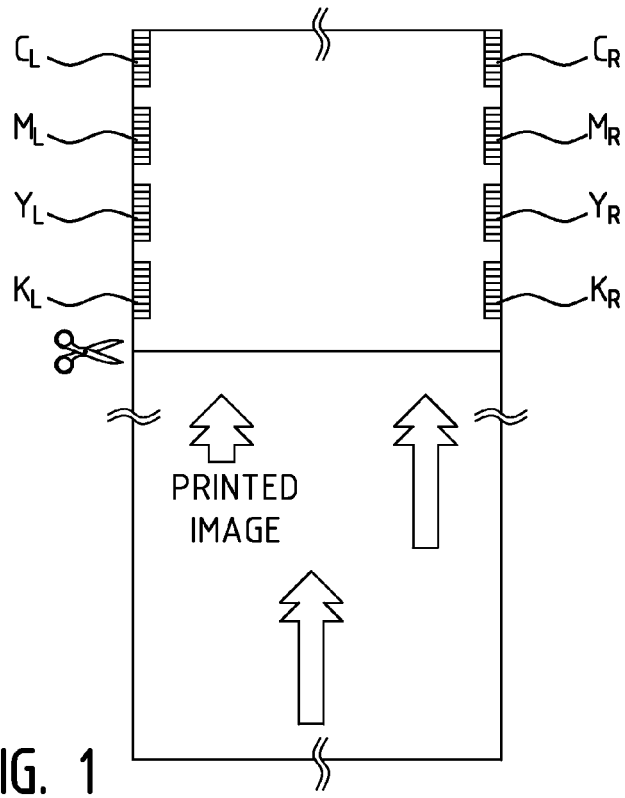
FIG. 1 is schematic representation of a print medium on which an image, as well as a series of control strips are printed in accordance with a first embodiment of the method of the invention.

FIG. 1 illustrates a print medium, e.g. a wall paper, on which a plurality of left and right control strips are printed in accordance with a first embodiment of the invention. The print medium comprises a print area where an image is printed, and a top area where a plurality of control strips are printed. The plurality of control strips comprises four left density strips $C_L, M_L, Y_L, K_L$ printed in a left margin of the top area and four right density strips $C_R, M_R, Y_R, K_R$ printed in a right margin of the top area. Ideally the left density strip $C_L$ for cyan should be identical to the right density strips $C_R$ for cyan. The same applies for the other basic colors: magenta ($M_L$, $M_R$), yellow ($Y_L, Y_R$) and black ($K_L, K_R$). However, in digital printing systems, in particular in electrophotographic printing systems using dry or liquid toner, often the same color is not printed with exactly the same density in a right and a left zone of a print medium.

Figure 1A:
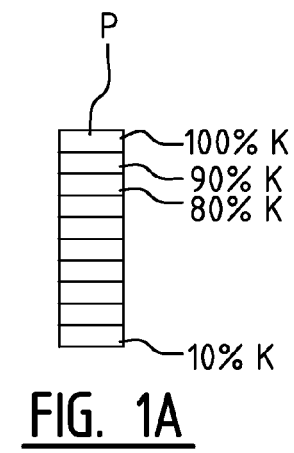
FIG. 1A is a detailed view of a single control strip.

As illustrated in FIG. 1A, a control strip comprises a plurality of patches having different density levels. In the illustrated example the control strip comprises 10 patches and the density levels are multiples of 10%. However, this control strip may also be a standard density strip with 23 patches. In the illustrated example density strips are printed for all four basic colors, but it is also possible to print density strips for less than four basic colors, depending on the colors for which a left/right correction is desirable. Further, the order in which the patches are printed in the left control strip may be different from the order in which the patches are printed in the right control strip. Also, the patches may be arranged in a square or rectangular shape instead of in a row.

Since the control strips are printed in a top area, this area can be cut off easily after printing in order to obtain e.g. a printed wall paper. In the illustrated example the control strips are arranged in a top area, but alternatively of in addition there may be provided control strips in a bottom area.

Figure 2:
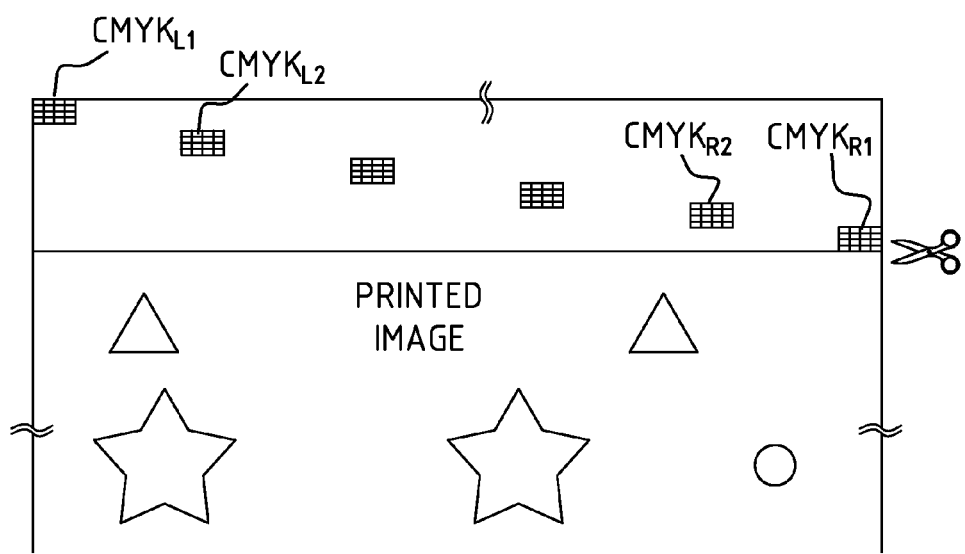
FIG. 2 is schematic representation of a print medium on which an image as well as a series of control strips are printed in accordance with a second embodiment of the method of the invention.

FIG. 2 illustrates a print medium on which an image, as well as a series of control strips is printed in accordance with a second embodiment of the method of the invention. In this embodiment there are printed a plurality of groups ($CMYK_{L1}$, $CMYK_{L2}$, $CMYK_{L3}$, ..., $CMYK_{R3}$, $CMYK_{R2}$, $CMYK_{R1}$) of control strips spread along the width of a top area of the print medium. Each group ($CMYK_{L1}$, $CMYK_{L2}$, $CMYK_{L3}$, ..., $CMYK_{R3}$, $CMYK_{R2}$, $CMYK_{R1}$) comprises a density strip for all four basic colors. In the illustrated example each group is arranged in a different row (perpendicular on the print direction). This will allow to measure the different groups using the same laterally moveable (perpendicular on the print direction) measurement device.

Figure 4:
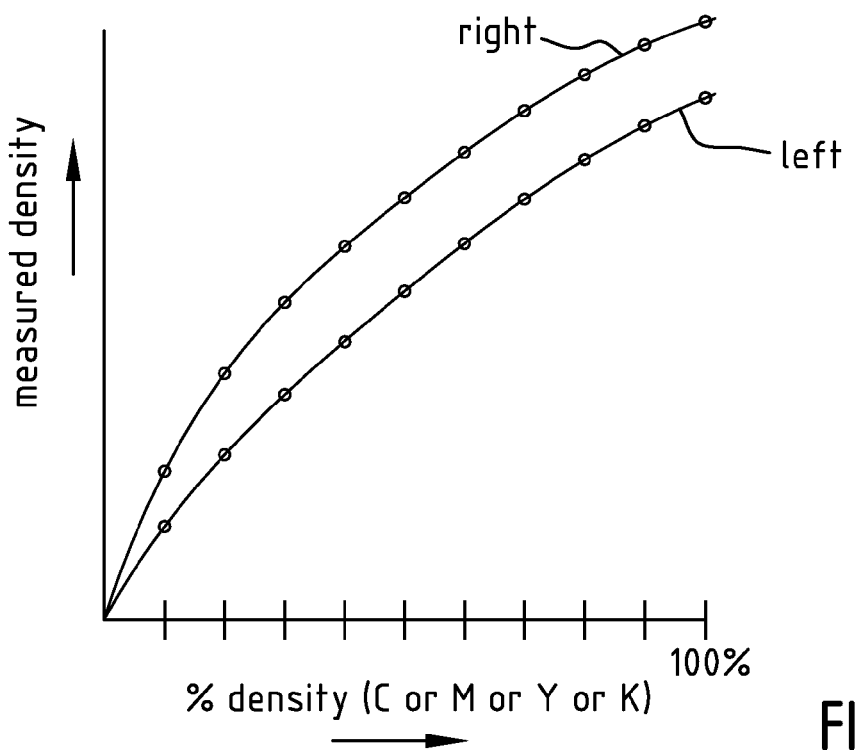
FIG. 4 is graph plotting the measured left and right density level in function of the set density of a plurality of patches, in an embodiment of the invention.

In the embodiment of FIG. 1 a density level of each patch P of each control strip ($C_L$, $M_L$, $Y_L$, $K_L$ $C_R$, $M_R$, $Y_R$, $K_R$) is measured, resulting in measurement values for the left patches ("left" in FIG. 4) and for the right patches ("right" in FIG. 4) which are plotted in FIG. 4 for one basic color. Next the printing system is adjusted based on a difference between the measured density levels of a left control strip and a corresponding right control strip in order to perform a left-right correction in the image to be printed, whereupon a following image may be printed using the adjusted printing system. In other words, the left and right control strips are printed during a first print job, e.g. on a roll of wall paper, together with a first image, and the adjusting is performed after or during the printing of the first image; whereupon a second image is printed during a second print job, using the adjusted printing system.

Figure 5A:
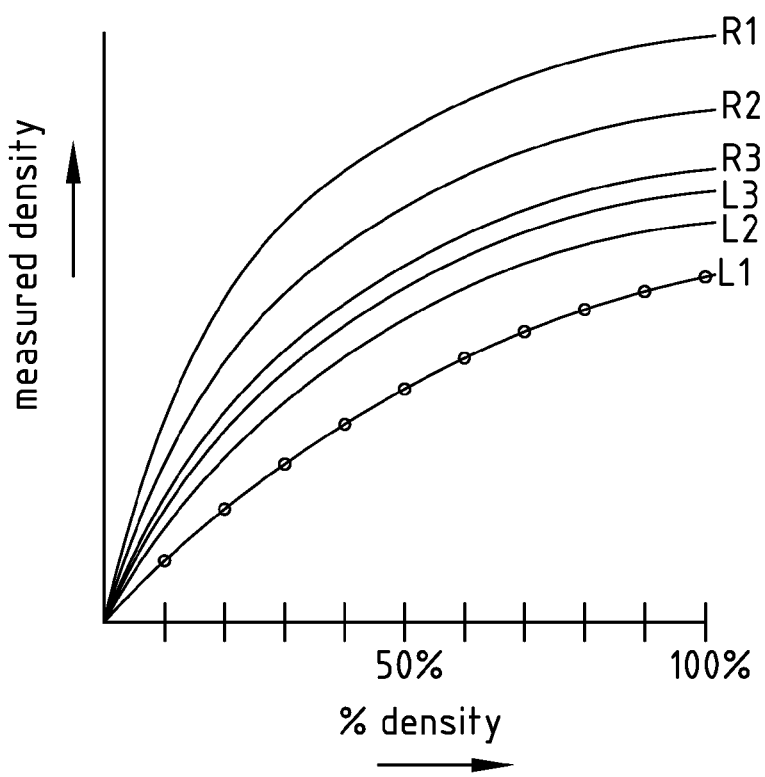
FIG. 5A is graph plotting the measured left and right density level in function of the set density of a plurality of patches, in an embodiment of the invention.

In the embodiment of FIG. 2 a density level of each patch P of each control strip group ($CMYK_{L1}$, $CMYK_{L2}$, $CMYK_{L3}$, ..., $CMYK_{R3}$, $CMYK_{R2}$, $CMYK_{R1}$) is measured, resulting in measurement values which are plotted in FIG. 5A for one basic color, wherein LEFT1 refers to the measured values of a density strip of group $CMYK_{L1}$, LEFT2 refers to the measured values of a density strip of group $CMYK_{L2}$, etc. Next a difference Δ between the control strip and a reference density may be calculated in function of the distance x. In FIG. 5B the measured density of the utmost left control strip ($CMYK_{L1}$) has been used as a reference density. FIG. 5B plots the difference Δ in function of the distance x for two different density values (50% and 100%) for a particular color, wherein x=L1 corresponds with the position of the group $CMYK_{L1}$, x=L2 corresponds with the position of the group $CMYK_{L2}$, etc. The printing system is adjusted based on this difference Δ(x), whereupon a following image may be printed using the adjusted printing system. As illustrated in FIG. 5B, even if the difference Δ is only measured for a number of positions along the width of the print medium, due to the gradual increase/decrease of this difference, it is typically possible to derive a function Δ(x) which allows for a correction on a pixel basis or on a LED group basis (see above). Even if only one left and one right density strip is provided as in the example of FIG. 1, it is typically possible to derive a function Δ(x) which allows for a good correction.

FIG. 5C is similar to FIG. 5B, with this difference that an average density of the utmost left control strip ($CMYK_{L1}$) and the utmost right control strip ($CMYK_{R1}$) has been used as a reference density. Usually this is preferred, in order to limit the maximum adjustment that needs to be performed to compensate for the differences.

Figure 3:
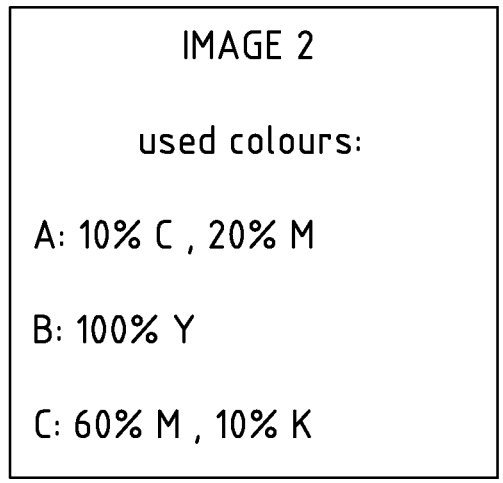
FIG. 3 is schematic representation of a print medium on which a first image as well as a series of control strips are printed in accordance with a third embodiment of the method of the invention, taking into account a second image to be printed after the first image.
Figure 3:
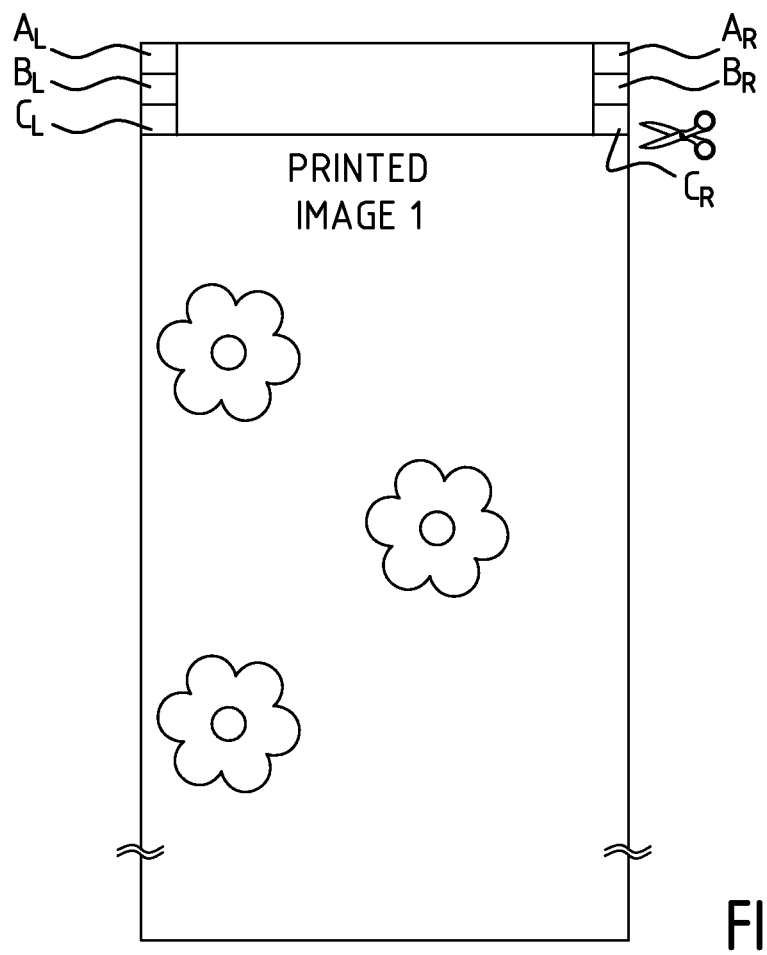

FIG. 3 illustrates a third embodiment of a method of the invention. It is assumed that after a first image, a second image needs to be printed, and that the second image is known when printing the first image. In the example illustrated, it is assumed that in the second image the following colors are used:
A: 10% C, 20% M;
B: 100% Y;
C: 60% M, 10% K;
The left and right control strip each comprises patches ($A_L$, $B_L$, $C_L$; $A_R$, $B_R$, $C_R$) for the colors A, B, C. The skilled person understands that in order to facilitate the adjustment there may be included a plurality of patches for each color, one patch thereof corresponding with the intended color and the other patches thereof corresponding with colors close to the intended color.

The patches ($A_L$, $B_L$, $C_L$; $A_R$, $B_R$, $C_R$) are printed together with the first image, wherein the patches are located in a left zone and a right zone of a top area of a first print medium, while the first image is printed below this top area. In that way, during of after the printing of the first image, a left/right correction may be performed based on color differences between said left and said right patches ($A_L$, $B_L$, $C_L$; $A_R$, $B_R$, $C_R$).

Figure 6:
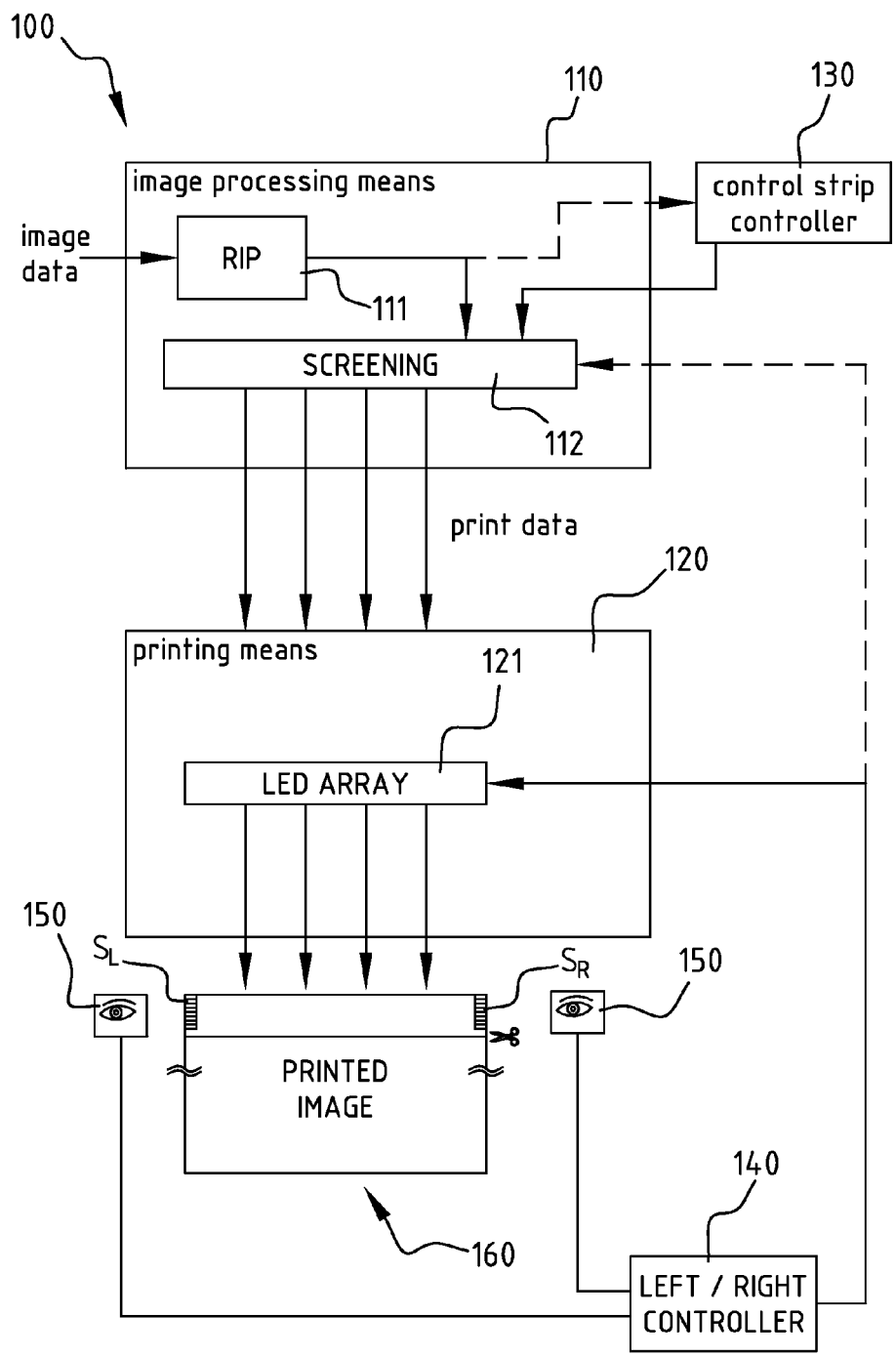
FIG. 6 is a block diagram illustrating a first embodiment of a system of the invention.

FIG. 6 illustrates a first embodiment of a digital printing system according to the invention. The digital printing system comprises an image processing means 110, a printing means 120, a control strip controller 130, a left/right controller 140 and two measurement devices 150. The image processing means 110 typically comprises a raster image processor (RIP) 111 and a screening means 112, and the printing means 120 typically comprises a print head such as a LED array 121. The raster image processor (RIP) 111 is a component which produces a raster image also known as a bitmap. Raster image processing is the process of turning e.g. vector digital information such as a PostScript file into a high-resolution raster image. The screening means 112 is configured to perform a reprographic image processing technique that simulates continuous tone imagery through the use of dot clusters, varying either in size, in shape or in spacing.

The control strip controller 130 is configured for indirectly (via the intermediate screening means 122) controlling the printing means 120 to print at least one left control strip $S_L$ in a left zone of a print medium 160 and at least one right control strip $S_R$ in a right zone of the print medium 160, wherein the left and right control strip $S_L$, $S_R$ each comprising a plurality of patches having different density levels and/or different colors.

The measuring devices 150 are configured for measuring a density level and/or color of each patch of the at least one printed left control strip $S_L$ and the at least one printed right control strip $S_R$. Note that there may also be provided only one measuring device 150 which is laterally moveable to measure both the left and the right control strips.

The left/right controller 140 is configured for adjusting the printing means 120, and in particular a LED array 121 thereof, and/or the image processing means 110, and in particular a screening means 112 thereof (indicated in a broken line in FIG. 6), based on a difference between the measured density levels and/or colors of the at least one left control strip $S_L$ and the at least one right control strip $S_R$ in order to perform a left-right correction in the image to be printed.

Typically, the control strip controller 130 is configured for controlling the printing means 120 to print the at least one left and right control strip on a print medium 160 together with a first image, and the left/right controller 140 is configured for performing the adjusting after or during the printing of the first image, such that a second later image is printable using the adjusted print means 120 and/or image processing system 110. In a particular embodiment corresponding with the exemplary embodiment of FIG. 3, the control strip controller 130 may be configured to determine at least one color used in the second image to be printed, the color being typically a combination of two or more of the following colors: cyan, black, magenta, yellow; and to include the at least one color in the at least one left and right control strip.

Figure 7:
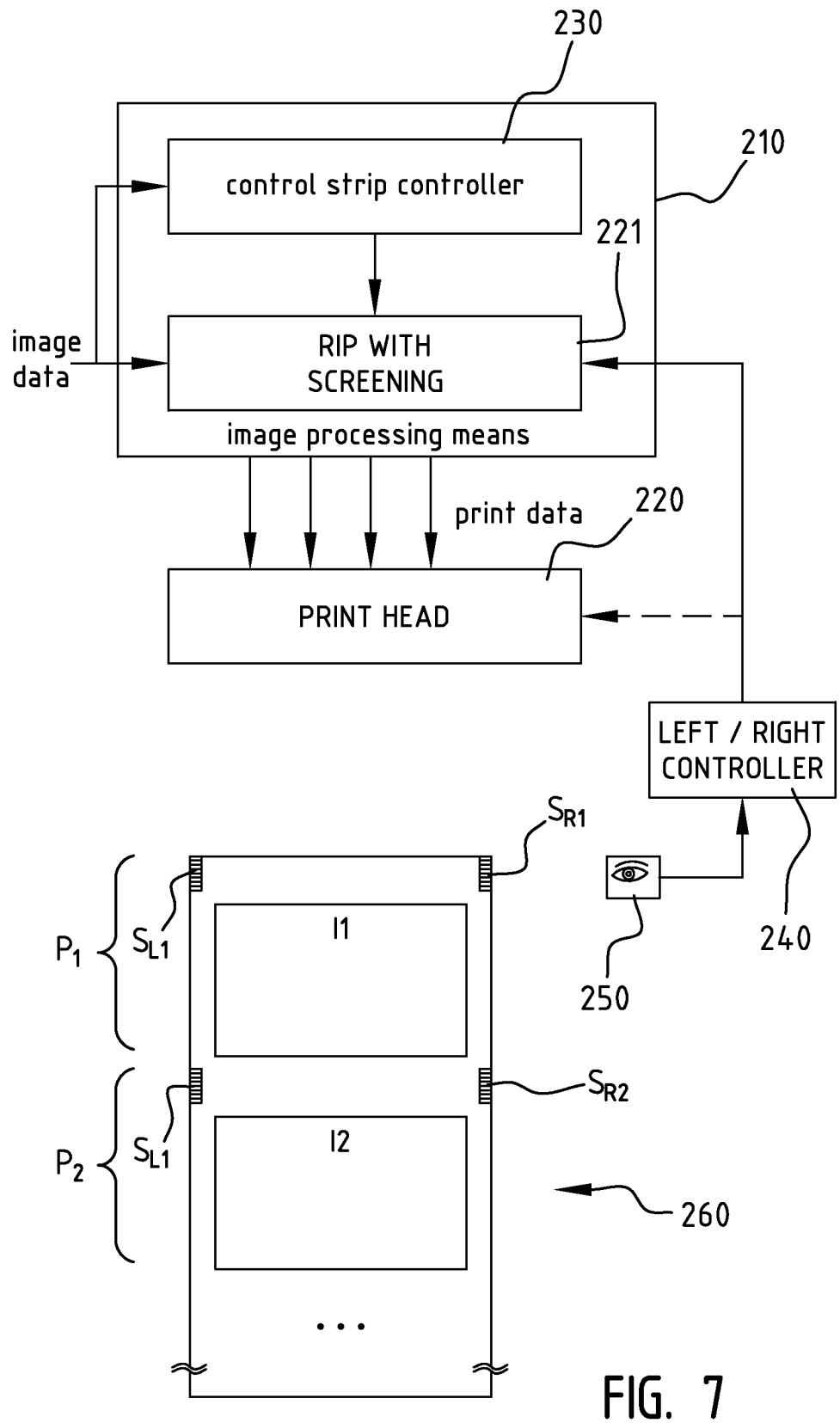
FIG. 7 is a block diagram illustrating a second embodiment of a system of the invention.

FIG. 7 illustrates a second embodiment of a digital printing system according to the invention. The digital printing system comprises an image processing means 210, a print head 220, a left/right controller 240 and a measurement device 250. The image processing means 210 comprise a control strip controller 230 and a raster image processor (RIP) 211 configured to perform screening. The control strip controller 230 is configured for controlling the RIP 221 for steering the print head 220 to print at least one left control strip $S_{L1}$ in a left zone of a print medium 260 and at least one right control strip $S_{R1}$ in a right zone of the print medium 260. This left and right control strip $S_{L1}$ and $S_{R1}$ may be printed during a first print job P1 together with a first image I1.

The measuring device 250 is configured for measuring a density level and/or color of each patch of the at least one printed left control strip $S_{L1}$ and the at least one printed right control strip $S_{R1}$.

The left/right controller 240 is configured for adjusting the print head 220 and/or the image processing means 210, and in particular a screening mechanism thereof, based on a difference between the measured density levels and/or colors of the at least one left control strip $S_{L1}$ and the at least one right control strip $S_{R1}$ in order to perform a left-right correction in a later second image I2 to be printed in a later second print job P2.

In a particular embodiment, the control strip controller 230 may be configured to determine at least one color used in the second image I2 to be printed, and to use the at least one color in the at least one left and right control strip $S_{L1}$ and $S_{R1}$. It is noted that the image data sent to the RIP 221 and to the control strip controller 230 may contain a list with the most important colors used in the image. This list may be used by the control strip controller 230 to determine at least one color used in the image. Alternatively the control strip controller 230 may derive the most important colors from the received image data.

Particular embodiments of the invention relate to the field of digital printing systems for so-called "continuous" webs, i.e. printing systems where a continuous roll of substrate is run through the printer, in particular to print wall paper.

A person of skill in the art would readily recognize that steps of various above described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labeled as "processors" or "means", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Whilst the principles of the invention have been set out above in connection with specific embodiments, it is to be understood that this description is merely made by way of example and not as a limitation of the scope of protection which is determined by the appended claims.

The invention claimed is:

1. A digital printing method for printing an image, using a printing system capable of printing a plurality of density levels, said method comprising:
   printing at least one left control strip in a left zone of a print medium and at least one right control strip in a right zone of said print medium, said left control strip comprising at least one left patch and said right control strip comprising at least one right patch, wherein settings are used which are intended for printing the same color and/or density level for a left patch of said at least one left patch and for a corresponding right patch of said at least one right patch;
   measuring a density level and/or color of at least said printed left patch and right patch;
   adjusting said printing system based on a difference between the measured density levels and/or colors of said left patch and said right patch in order to perform a left-right correction in said image to be printed; and
   printing the image using said adjusted printing system.

2. The digital printing method of claim 1, wherein said left control strip comprises a plurality of left patches, and said right control strip comprises a corresponding plurality right patches, wherein different intended colors and/or density levels are used for said plurality of left patches and the same different intended colors and/or density levels are used for said plurality of right patches; wherein the measuring comprises measuring each left and corresponding right patch; and the adjusting is based on a plurality of differences between each left and corresponding right patch.

3. The digital printing method of claim 1, wherein said at least one left and right control strip are printed together with a first image during a first print job, and said adjusting is performed after or during the printing of said first image; and wherein a second image is printed during a second print job following said first print job using said adjusted printing system.

4. The digital printing method of claim 3, wherein, based on the second image to be printed, at least one color is determined; and wherein said at least one determined color is used for determining the intended color of the at least one left and right patch.

5. The digital printing method of claim 1, wherein said at least one left and right control strip each comprises a control strip comprising a plurality of cyan patches having different density levels, a control strip comprising a plurality of black patches having different density levels, a control strip comprising a plurality of magenta patches having different density levels, and a control strip comprising a plurality of yellow patches having different density levels.

6. The digital printing method of claim 1, wherein said at least one left and right control strips are printed in a left and right margin of the print medium.

7. The digital printing method of claim 1, wherein said at least one left and right control strips are printed at the top and/or at the bottom of the print medium, outside a normal printing area for printing an image.

8. The digital printing method of claim 1, wherein the print area is divided in a plurality of adjacent columns, and the measured density and/or color levels are used to determine for each column of said plurality of adjacent columns at least one correction value; and wherein said adjusting is based on said at least one correction value for each column.

9. The digital printing method of claim 1, wherein said printing system comprises a printing means, and said adjusting comprises adjusting said printing means.

10. The digital printing method of claim 9, wherein said printing means comprises a LED array, and said adjusting comprises adjusting an amount of light emitted by a LED group of said LED array, said LED group comprising at least one adjacent LED.

11. The digital printing method of claim 1, wherein said printing system comprises image processing means, and said adjusting comprises adjusting the image processing means.

12. A digital printing system capable of printing a plurality of density levels, comprising:
   an image processing means and a printing means;
   a control strip controller configured for controlling said printing means to print at least one left control strip in a left zone of a print medium and at least one right control strip in a right zone of said print medium, said left control strip comprising at least one left patch and said right control strip comprising at least one right patch, said controlling using settings intended to print the same color and/or density level for a left patch of said at least one left patch and for a corresponding right patch of said at least one right patch;
   at least one measuring device configured for measuring a density level and/or color of said left patch and said right patch; and
   a left/right controller configured for adjusting said printing means and/or said image processing means based on a difference between the measured density levels and/or colors of said left and right patch in order to perform a left-right correction in the image to be printed.

13. The digital printing system of claim 12, wherein the control strip controller is configured for controlling said printing means to print said at least one left and right control strip together with a first image during a first print job, and said left/right controller is configured for performing the adjusting after or during the printing of said first image, such that a second image is printable during a second print job following said first print job using the adjusted printing means and/or image processing system.

14. The digital printing system of claim 12, wherein said control strip controller is configured to determine at least one color, based on the second image to be printed; and to include said at least one determined color in the at least one left and right control strip.

15. The digital printing system of claim 13, wherein said control strip controller is configured to determine at least one color, based on the second image to be printed; and to include said at least one determined color in the at least one left and right control strip.

16. A digital printing method for printing an image, using a printing system capable of printing a plurality of density levels, said method comprising:
  printing at least one left control strip in a left zone of a print medium and at least one right control strip in a right zone of said print medium, said left control strip comprising at least one left patch and said right control strip comprising at least one right patch, wherein settings are used which are intended for printing the same color and/or density level for a left patch of said at least one left patch and for a corresponding right patch of said at least one right patch;
  measuring a density level and/or color of at least said printed left patch and right patch;
  adjusting said printing system based on a difference between the measured density levels and/or colors of said left patch and said right patch in order to perform a left-right correction in said image to be printed; and
  printing the image using said adjusted printing system;
  wherein said at least one left and right control strip are printed together with a first image during a first print job, and said adjusting is performed after or during the printing of said first image; and
  wherein a second image is printed during a second print job following said first print job using said adjusted printing system.

17. The digital printing method of claim 16, wherein said left control strip comprises a plurality of left patches, and said right control strip comprises a corresponding plurality right patches, wherein different intended colors and/or density levels are used for said plurality of left patches and the same different intended colors and/or density levels are used for said plurality of right patches; wherein the measuring comprises measuring each left and corresponding right patch; and the adjusting is based on a plurality of differences between each left and corresponding right patch.

18. The digital printing method of claim 16, wherein, based on the second image to be printed, at least one color is determined; and wherein said at least one determined color is used for determining the intended color of the at least one left and right patch.

19. The digital printing method of claim 16, wherein said at least one left and right control strips are printed in a left and right margin of the print medium.

20. A computer program product comprising computer-executable instructions for performing at least the adjusting step of the method according to claim 1, when the program is run on a computer.

* * * * *